W. J. LANKFORD.
Trough-Filler.

No. 215,638.  Patented May 20, 1879.

WITNESSES:
Henry N. Miller
C. Sedgwick

INVENTOR:
W. J. Lankford
BY
ATTORNEYS.

UNITED STATES PATENT OFFICE.

WILLIAM J. LANKFORD, OF MIRABILE, MISSOURI.

IMPROVEMENT IN TROUGH-FILLERS.

Specification forming part of Letters Patent No. 215,638, dated May 20, 1879; application filed March 29, 1879.

*To all whom it may concern:*

Be it known that I, WILLIAM J. LANKFORD, of Mirabile, in the county of Caldwell and State of Missouri, have invented a new and Improved Trough-Filler, of which the following is a specification.

The object of this invention is to provide an automatic device for filling drinking-troughs for cattle from ponds and shallow wells, so as to supply the trough with fresh and pure water, avoid having the cattle approach the pond, to enable water to be supplied from frozen ponds without having to cut the ice, and to avoid wasting the water.

It consists of a pipe or tube leading from the pond to the trough, having a valve at the upper end within the pond, and a stem running through to the trough, where it is pivoted to a float in such a way that when the trough is sufficiently full of water the rise of the float closes the valve and stops the flow; but when the water falls, the float, falling with it, opens the valve and permits the water to flow again. Other details of the invention will be referred to further on.

Figure 1:
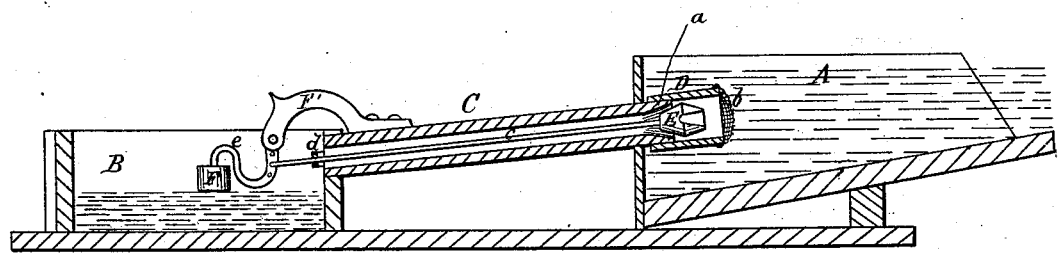
Figure 2:
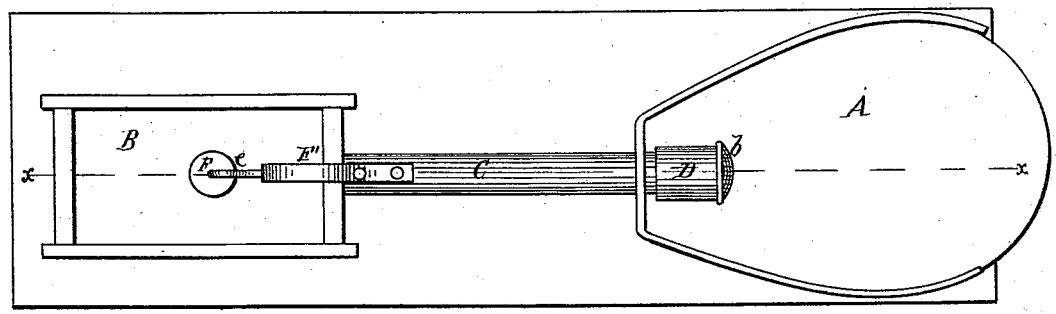
Figure 3:
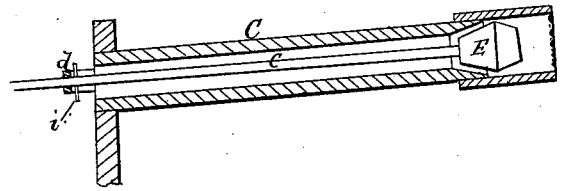

In the accompanying drawings, Figure 1 is a longitudinal section of the invention on line $x$ $x$ of Fig. 1. Fig. 2 is a top view or plan of the same; and Fig. 3 shows a modification.

Similar letters of reference indicate corresponding parts.

Referring to the drawings, A represents the pond or other reservoir of water from which the supply is to be drawn, and B represents the trough from which the cattle are watered. Connecting the trough and pond at a slight incline to the former is a tube or pipe, C, at the upper or pond end, provided with an internal conical valve-seat, $a$, while over the end is placed a cap, D, with a wire-gauze cover, $b$, to prevent sticks and other articles from entering the tube and interfering with the working of the valve. E is the valve, conical in form, to adapt it to set in the seat $a$, and having a stem, $c$, projecting through the tube and through a guide, $d$, across the lower end of the tube.

The projecting end of the valve-stem is pivoted to the goose-neck stem $e$, the downward-projecting end whereof is fixed to the float F, while the upward end is pivoted to the curved arm F', projecting over from the end of tube C.

By moving the stem $e$ up and down on its pivot the valve is moved to and from its seat, and thus when the water rises in the trough B the float is lifted, and through the stem draws the valve to its seat and closes the tube; but when the water falls, the float, dropping with it, pushes the valve from the seat and opens the tube.

In arranging the apparatus the upper end of the tube should open some distance below the surface of the water in the reservoir, and as near the bottom as practicable, so as to make all the water available, while the lower end should open near the top of the trough to give full play to the float.

The arrangement of the apparatus above described is entirely automatic. When the water in the trough falls from a required level the float falls, and through its connection with the valve-stem opens the valve, and the water runs through to the trough, filling it again, and when it reaches the proper height it closes the valve, thus shutting the water off and preventing waste.

The goose-neck stem $e$, it will be observed, has several holes in its upper end to enable the valve-stem to be connected with it at different points, so as to throw the float farther up or down, and thus adjust it to keep the trough one-third, one-half, or entirely, full of water. This arrangement permits a supply of fresh water to be kept in the trough, taken from the surface of the water in the pond, thus avoiding the scum and other impurities floating on the surface. It also enables the pond to be kept clean, as it can be fenced in, keeping the cattle out of it, and the mud and filth liable to get in it when the cattle have access to it.

It is intended to have the float inclosed to prevent the cattle from injuring it or interfering with its workings.

As the freezing of the water in the trough would interfere with the working of the float the apparatus has to be modified to enable it to work satisfactorily in the winter.

To this end the float is removed from the trough and the valve-stem is operated by hand, and when the valve is to be opened the stem is pushed in and fastened by passing a pin, *i*, through a hole back of the guide *d*, and when it is to be closed withdrawing the pin and passing it through the same hole in front of the guide *d*, thus securing it against being pushed open from the trough. Thus as long as any water remains unfrozen in the pond it can be utilized, notwithstanding it is frozen on the surface.

Having thus described my invention, I claim as new and desire to secure by Letters Patent—

The combination of the conical valve E, the valve-stem *c*, the arm F', the goose-neck stem *e*, and the float F with the pond A, the trough B, and the tube C, substantially as and for the purpose set forth.

WILLIAM JAMES LANKFORD.

Witnesses:
  DAVID YOUNG,
  WILLIAM MCAFEE.